Figure 1:
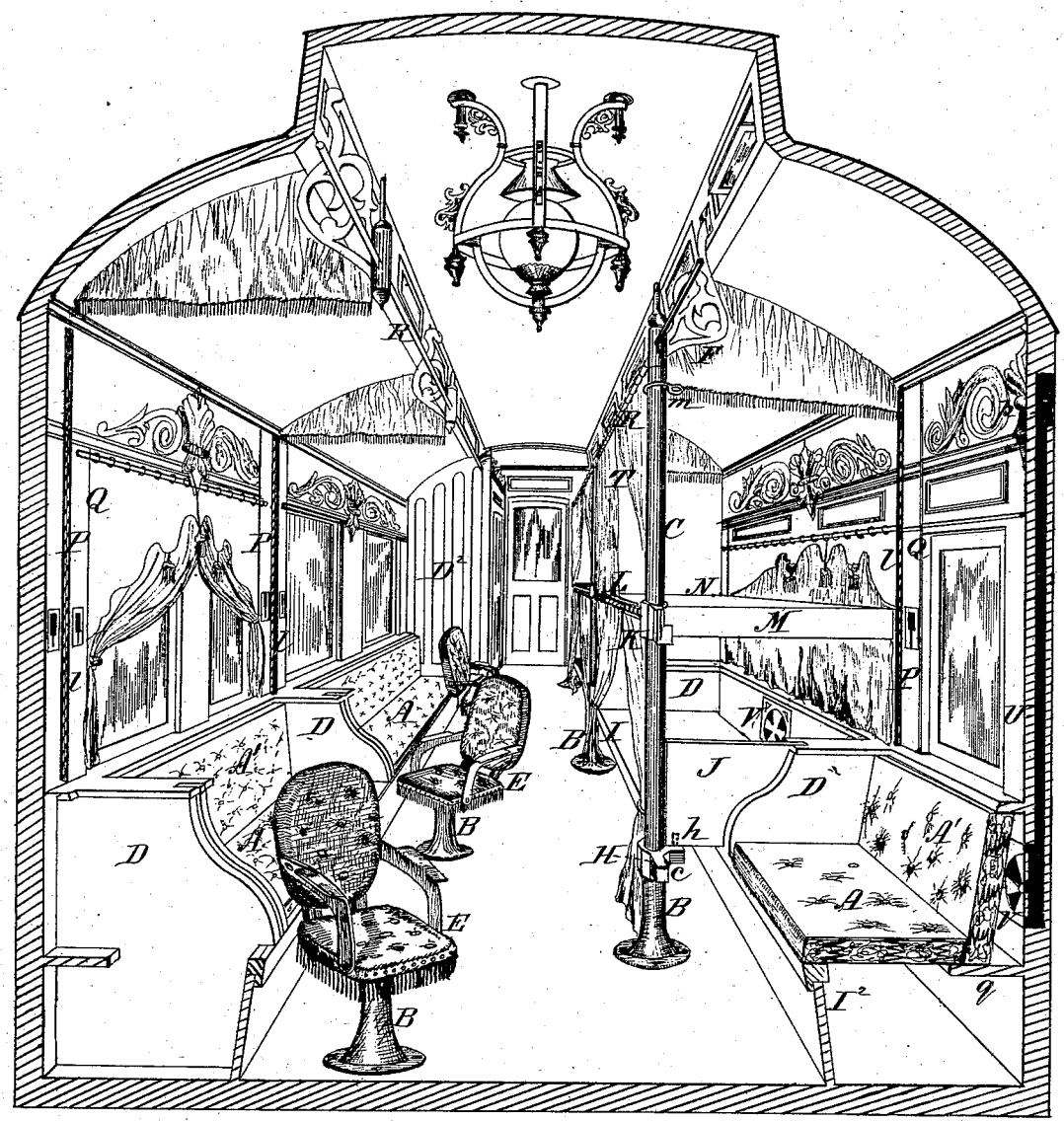

4 Sheets—Sheet 1.

E. P. KELLOGG.
SLEEPING-CARS.

No. 194,154. Patented Aug. 14, 1877.

Witnesses: Eugene P. Kellogg
Inventor

4 Sheets—Sheet 2.

E. P. KELLOGG.
SLEEPING-CARS.

No. 194,154. Patented Aug. 14, 1877.

Witnesses:
Jas. H. Wagner.
Floyd Norris.

Inventor
Eugene P. Kellogg
by Johnson & Johnson
Att'ys

N. PETERS, PHOTO-LITHOGRAPHER, WASHINGTON, D. C.

4 Sheets—Sheet 3.
E. P. KELLOGG.
SLEEPING-CARS.
No. 194,154. Patented Aug. 14, 1877.
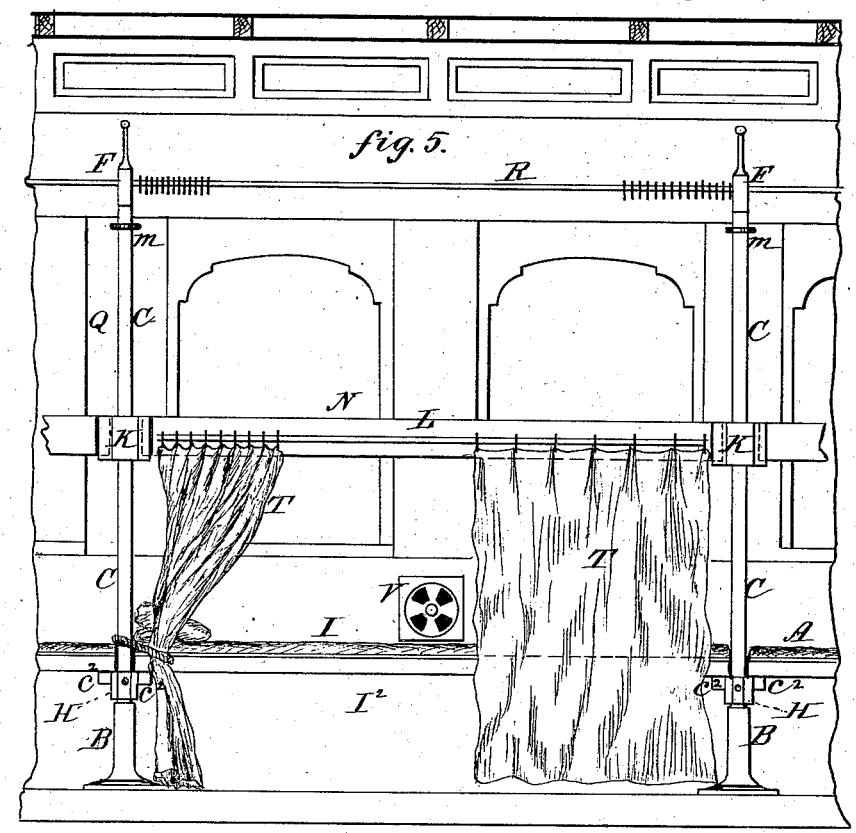
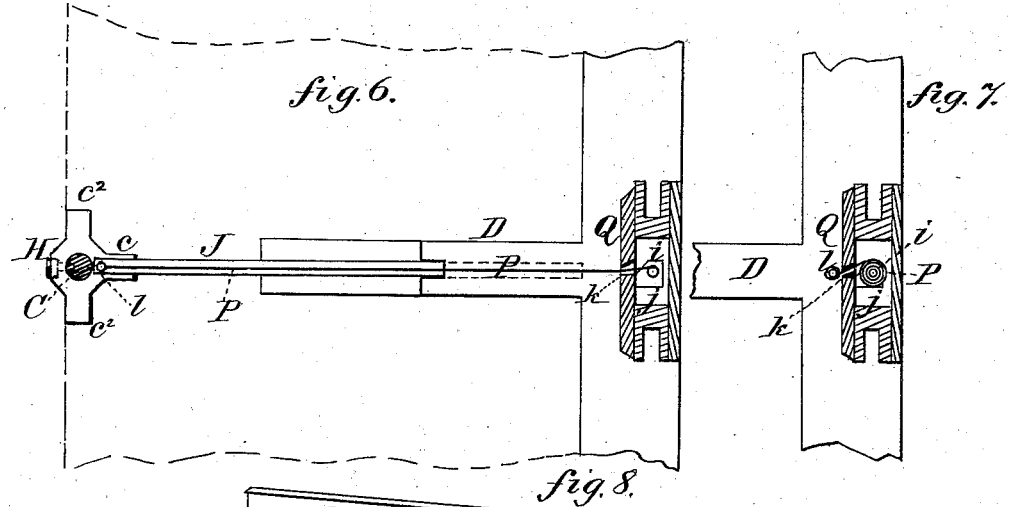
Witnesses:
J. West Wagner
Floyd Norris
Inventor
Eugene P. Kellogg,
by Johnson & Johnson
Attys.
N. PETERS, PHOTO-LITHOGRAPHER, WASHINGTON, D. C.

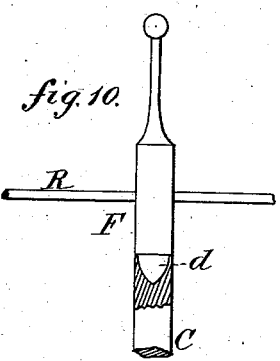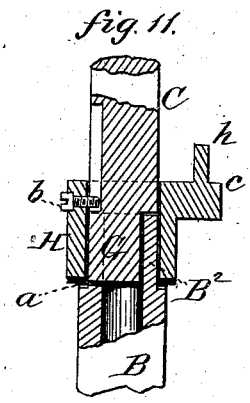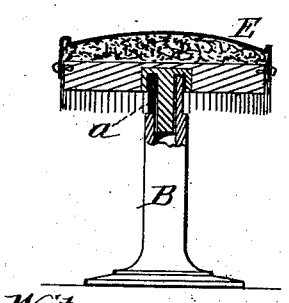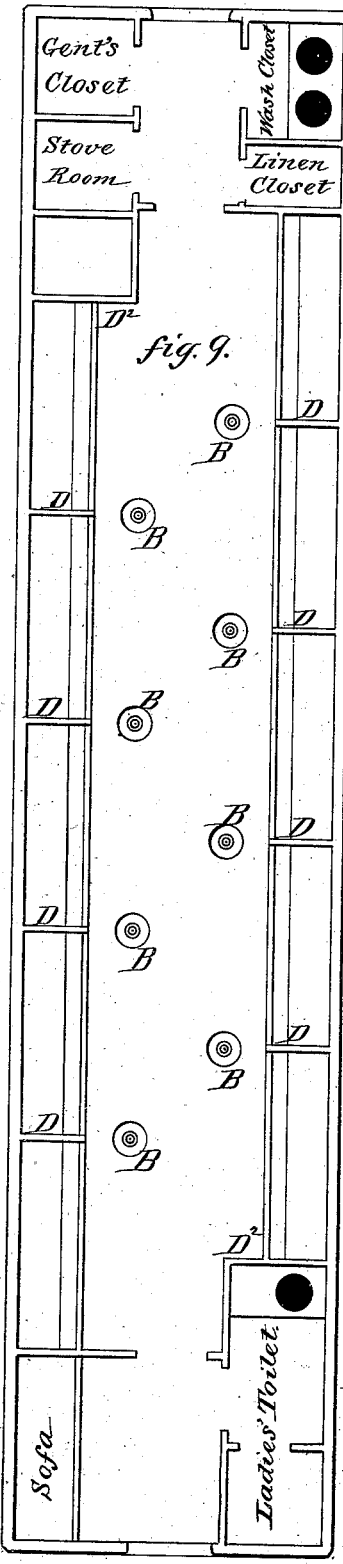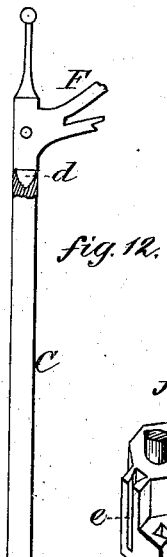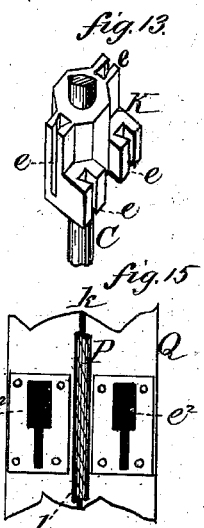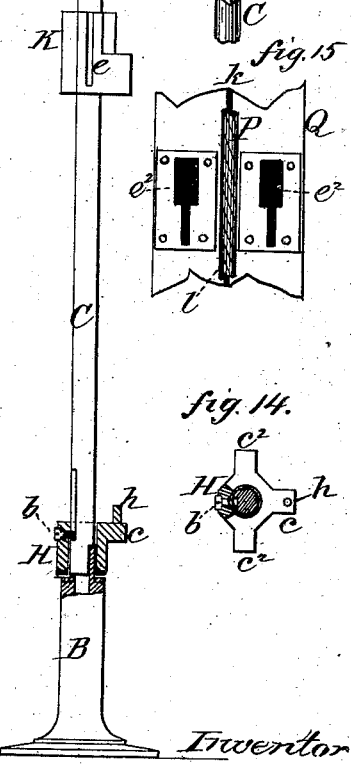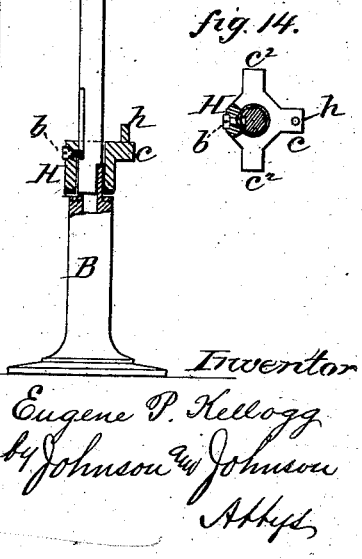

UNITED STATES PATENT OFFICE.

EUGENE P. KELLOGG, OF NEW YORK, N. Y.

IMPROVEMENT IN SLEEPING-CARS.

Specification forming part of Letters Patent No. 194,154, dated August 14, 1877; application filed June 22, 1877.

*To all whom it may concern:*

Be it known that I, EUGENE P. KELLOGG, of the city and county of New York, and State of New York, have invented certain new and useful Improvements in Sleeping-Cars; and I do hereby declare that the following is a full, clear, and exact description thereof, which will enable others skilled in the art to which it appertains to make and use the same, reference being had to the accompanying drawings, and to the letters of reference marked thereon, which form a part of this specification.

In a patent granted to me September 21, 1875, No. 168,027, I have described certain improvements involving a new construction, combinations, and devices for converting a sleeping-car for night travel into a parlor-chair car for day travel.

My present invention involves several important particulars and matters of improvement on my said patent, to obtain certain advantages by new construction, combinations, and devices.

In my said patent the change for sleeping and day or parlor cars was effected by shifting the chair-pedestals on one side of the car from the ends of the permanent side seats to the center or middle of said seats to obtain the necessary passage-way between the chairs for day travel, and in the formation of sleeping-berths these pedestals on one side were shifted back to positions opposite the ends of the side seats, in order to form base-sections upon which to rear stanchions or posts to form the lower and upper berths at night.

One object of my present invention is to avoid the shifting of the pedestals by fixing them opposite the side-seat ends on both sides of the car, and in alternate positions to leave a free passage-away when used with chairs.

This advantage is obtained by a new construction, arrangement, and organization of the permanent side seats, end closets, and rooms. The chairs and the stanchions are detachable from the pedestals, and are used interchangeably for the purpose stated.

The end divisions for the berths are formed by a new device, consisting of a wall-curtain adapted to roll and be concealed in a recess in the car-wall, and to be drawn therefrom for use in a straight line at right angles to the car-wall. It is mounted upon and carried by a spring-roll, which draws it into place when not in use. It is drawn out for use between the end rails of the upper berth, and in a vertical line with the ends of the permanent side seats, and in connection with detachable or extensible end boards of said seats. Such wall-curtain forms the partition for both the upper and lower berths, and is secured in any suitable way to the berth-stanchions, so that the rolling partitions are not only combined with the car-wall to receive and conceal them, but with the side-seat ends, their extension-boards, the upper berths, and the stanchions, giving a simple, quick, and compact way of forming end inclosures for the berths, and rolling the same straight back in the wall when the berth-sections are taken down. The lower berths are ventilated by flues formed in the car-wall—one or more flues to each section—having its lower end opening at the inner side of the wall into the lower berth, and provided with a register, and the upper end opening at the outer side of the wall at or near the top of the car. The ventilation of the lower berths is an important matter.

In forming the berths, the stanchions or posts are secured in the pedestal-sockets and to top brackets, and the front and end rails are secured to the stanchions by dovetail connections. Each upper berth has separate end rails, and all the berths can be made up at once or separately, if desired.

A more particular and detailed description of these several matters will be given hereinafter.

Figure 2:
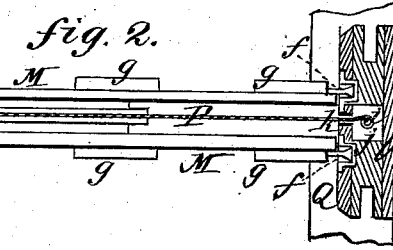
Figure 3:
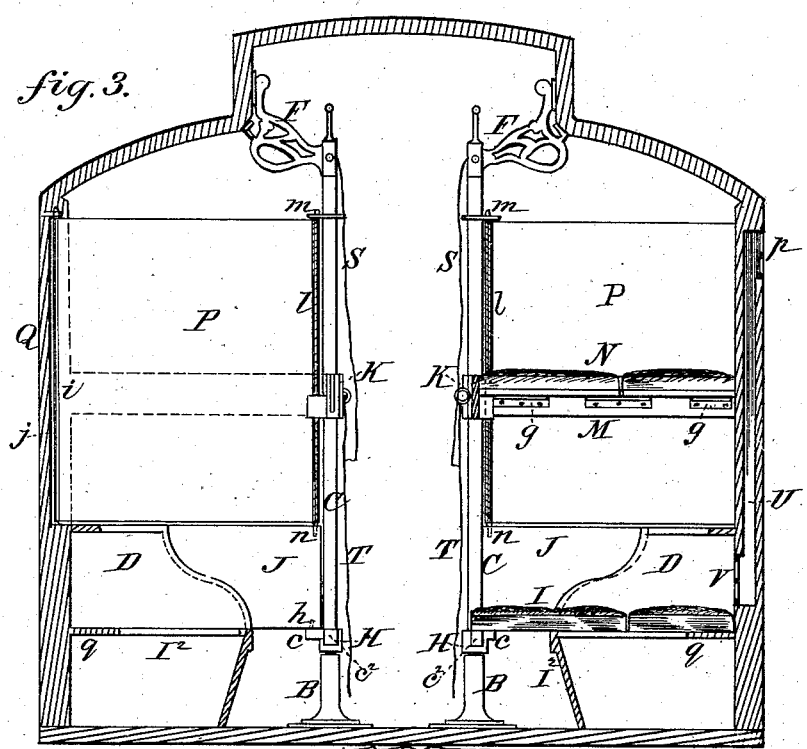
Figure 4:
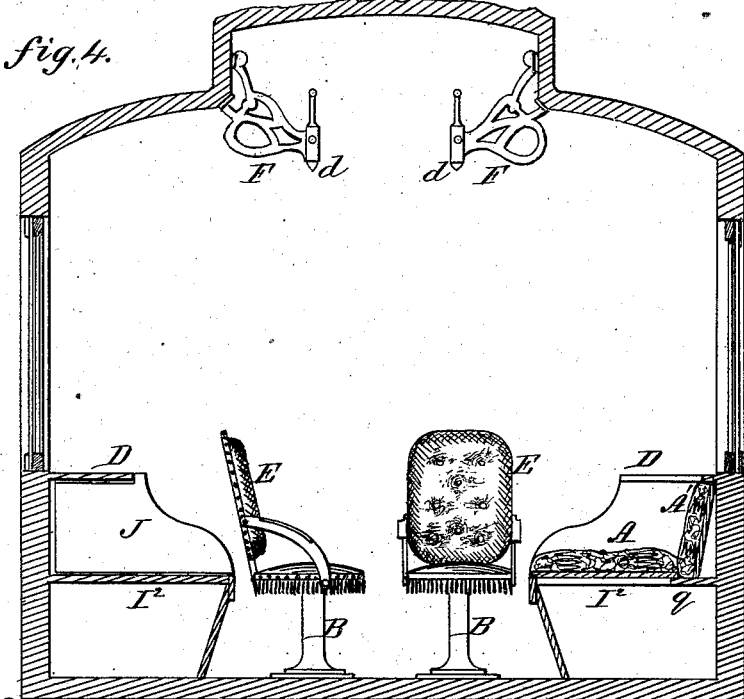

Referring to the drawings, Figure 1, Sheet 1, represents an interior view of a portion of a car, showing on one side two sections of sleeping-berths, and on the other side the arrangement of the parlor-chairs and long fixed side seats; Fig. 2, same sheet, a horizontal section of a portion of the car-wall, showing the rolling wall-curtain partition drawn out in position between the end rails of the upper berth and secured to the stanchions; Fig. 3, Sheet 2, a cross-section of the car with the berths arranged for night travel; Fig. 4, same sheet, a similar section, showing the arrangement of the chairs and the fixed side seats for day travel; Fig. 5, Sheet 3, a vertical longitudinal section with the berths arranged for night travel; Fig. 6, same sheet, a horizontal section, showing the rolling wall-curtain drawn out and secured to the stanchions; Fig. 7, same sheet, a similar view, showing the wall-curtain rolled up on its roll into its wall-recess; Fig. 8, same sheet, one of the end rails of the upper berth; Fig. 9, Sheet 4, a floor plan of a car, showing the arrangement of the fixed pedestals in relation to the long fixed side seats, by which a free passage-way is obtained through the car when adapted for parlor-chairs; Figs. 10, 11, 12, 13, and 14, details of the berth-supporting stanchion and pedestal; Fig. 15, a detail of the wall-sockets for the end rail of the upper berth; and Fig. 16, a detail section of the chair and pedestal.

The car is constructed with fixed side seats A, of a length equal to that of a sleeping-berth, so as to form sofas and allow of their being readily converted into lower berths, the seat-frames being adapted for such purpose and for storage of the parts forming the upper berths. The manner of arranging these side seats has peculiar relation to the conversion of the car from berth-sections into a parlor-chair car by means of fixed pedestals B, adapted for use alternately with chair-seats, with a free passage-way and stanchions or posts C for the sleeping-sections. The pedestals for this purpose are arranged opposite the side-seat ends D, and the ends of the side seats on one side of the car are arranged opposite the middle of the length of the seats on the other side of the car, as shown in Fig. 9. This relative position of the side seats is obtained by the extension of the convenience-rooms at each end on alternate sides of the car only, inward the distance of half a section, or about three feet, which will bring the inner wall end $D^2$ of such rooms on one side of the car opposite to the middle of the berth on the opposite side of the car, and thus bring the lines of seats or berths at each end of the car farther inward on one side at one end, and on the other side at the opposite end of the car.

By this construction the sleeping-sections are of the usual length in connection with the end rooms, but these rooms extend at both ends and on alternate sides of the car a distance of half a section further into the car than heretofore, to obtain the advantage of arranging the fixed pedestals opposite the seat ends on both sides of the car, with a free passage-way through the car when the chairs E are used.

This arrangement also brings the chairs opposite the seat ends D, and leaves the long side seats A comparatively free.

The pedestals are secured to the car-floor by base-flanges, and have socket ends to receive swivel-pins of the chairs, as shown in Fig. 16.

In making up the sleeping-sections, the stanchions or posts C are reared upon the pedestals B, and secured in position at the top by a bracket, F, secured to the roof of the car. The lower ends of the stanchions have shouldered flattened ends G, Fig. 11, and the shouldered socket ends $B^2$ of the pedestals have side openings $a$, into which the flattened ends are inserted sidewise, and secured by a collar or sleeve, H, fitted to slide over the junction of the joining parts and to rest upon the shoulder of the pedestal. The collar H is held from turning by a screw, $b$, passing through it into a slot in the stanchion, and it is also provided with three arms or projections, $c\ c^2$, on which the lower bed I and end partition J are supported.

The upper ends of the stanchions are socketed to receive the shouldered ends $d$, Fig. 10, of the brackets F, and thus the stanchions are held securely at both ends; but any suitable means may be adapted for joining and fastening them in place, and allow of their easy removal.

Each stanchion or post has, near the middle of its length, a shoulder formation or enlargement, K, upon which the front and end rails L M of the upper berth are supported. These shoulder enlargements K have vertical dovetail sockets $e$, Fig. 13, to receive corresponding tongues $f$ on the ends of the front and end rails, and thus form a secure lock to these parts. The sockets for the front rails are formed on opposite sides of the stanchions, and those for the outer ends of the end rails are formed on the inner side, upon slightly lower shoulders, and side by side, to give separate and independent support for the outer ends of separate end rails of each berth, as shown in Figs. 2 and 13. The inner ends of these end rails are also provided with dovetail tongues $f$, which fit into corresponding socket-openings $e^2$, formed in plates secured to the car-wall, as shown in Figs. 1 and 15. The upper berth bottoms N are supported by cleats or brackets $g$ on the inner sides of the end rails M.

This arrangement of separate and distinct end rails gives the advantage of making up each berth independent of the other, and at different times, or all at once.

The upper berth N is formed by taking the cushions of the long side seats A, and supporting them upon the cleats or brackets $g$ of the separate end rails; while the lower berth I is formed by a folding bed or mattress, supported upon the long seat-frame $I^2$ and projections $c^2$ on the opposite sides of the stanchion collar or sleeve. When not in use it is stowed away in the long side-seat frame $I^2$. The ends D of the long side seats A are formed with double walls, or spaces between the joining ends of said seats, for the reception of a detachable board or panel, J, which is used in connection with the side-seat ends D to close the ends of the lower berth, as shown in Fig. 3. This panel J is made to conform to the form of the seat end when inserted into the space in said end out of the way, and when used in making up the section it is drawn out, reversed, and inverted, with one end fitted into the seat-end space, and the other or straight end fitted over a pin, $h$, Fig. 11, on the projection $c$, on the inner side of the sliding collar or sleeve H of the stanchion.

When so secured it forms an extension of the seat end, and partitions the berths at this point only as high as the seat end. From this line the end partitions for the lower and upper berths are formed by rolling wall curtains or partitions P, Figs. 2, 3, and 6—that is to say, a curtain or partition that unrolls outward from the wall Q, and forms a junction with the stanchion or post C—and is drawn into the wall out of the way when not required for use, so that these end partitions are formed and unformed by being operated in straight lines at right angles to the car-wall. They are composed of flexible material, and are mounted upon vertical spring-rolls $i$, fitted in bearings in recesses $j$ in the car-wall, and suitably covered; or each curtain may be mounted with its roll in a suitable case or inclosure on the side of the wall, a vertical slot, $k$, being only necessary, through which to draw out and return the curtain. A hand-rod, $l$, is attached to the outer edge of the curtain P by which to operate it and to form a stop to keep it from being drawn into the case, and also by which to secure it to the stanchion or post when drawn out to cover the end of the berth. When in use, it forms a vertical extension of the seat ends D and its adjustable panel J, and closes with the stanchions with which its hand-rod is fastened at its top by a loop, $m$, or other device, and inserted at its lower end into a hole, $n$, Fig. 3, in the top edge of the adjustable panel J. The roll is so mounted, and its spring-connection is such, that it constantly tends to wind or roll the curtain, so that it is only necessary to draw out the curtain in making up the berths and fasten the hand-rod $l$, and in taking down the berths the curtain-rod is simply released from its fastenings and it at once returns to its roll by the action of the spring, and is out of the way.

Now, this arrangement admits of using the curtain in the small space between the end rails M of the upper berths, as shown in Fig. 2, and allows the curtains to be drawn out after the upper and lower berths are made, and to be rolled up out of the way in taking down the berth. This construction gives greater convenience and facility in working, and protects the curtains from liability to be torn and damaged in handling the several parts by which the berths are formed.

The roof-brackets F carry a horizontal rod, R, between them, from which hang a pair of front curtains, S, for the upper berth, while the front rail L carries a rod for curtains T for the lower berths. These curtains are hung by hooks and eyes, to be folded and drawn out upon the rods. The upper berths have the usual top ventilation.

For ventilating the lower berths a vertical flue, U, is formed in the car-wall, between the windows, and opens into the car just above the lower bed, with a register, V, as shown in Figs. 1 and 3. These flues U open on the outside, at or near the top $p$ of the car, and the movement of the cars draws the air from the lower berths up through the flues. The registers are closed when desired.

The cushions for the long side seats are formed with separate backs A', which are supported upon broad ledges $q$, and the seats are fitted up against them. When not in use, the stanchions, front and end rails, and the bed for the lower berth are all stowed away into the box formed by the frame $1^2$ of the long side seats, and the cushions which were used for the upper berth are returned to their places to form the side seats. Revolving or other chairs E are mounted upon the fixed pedestals B, in positions opposite the side-seat arms D, and a parlor day-car is thus formed for day travel.

When adapted for sleeping-berths the arrangement of the fixed pedestals brings the half of each section on one side of the car opposite to the half of each section on the opposite side of the car, and by this means I obtain a fixed arrangement of chair-pedestals on both sides, with a clear passage-way through the car.

The parlor-chairs, consisting of the seat and back, are removed from the pedestals and stowed in any suitable place when converting the car for night travel, the pedestals serving as the chair-supports or as the stanchion base-sections in adapting a parlor-chair car as a sleeping-car, as stated.

In convertible sleeping and parlor cars fixed pedestals have been used for chair seats and supports for the lower berth bottom. In such cars folding partitions, to form the ends of the berths, have been used, hinged together so as to be folded into recesses formed in raised panels, such folding partitions being held in grooves by pins entering slots in the top and bottom of the recess, and adapted to be moved in said slots in position to form the partitions, or to be folded into the recess, the sections of the partitions folding one upon the other as they are entered into the wall recess.

I claim—

1. In a convertible sleeping and parlor car, the combination, with the opposite side-seat ends D, arranged in fixed alternate positions, the seat ends on one side being opposite the middle of the seats on the other side, of the pedestals B, fixed in positions on a line with the alternating seat ends, and the stanchions or berth-posts adapted for use with said fixed pedestals, as herein set forth.

2. In a sleeping-car, the combination, with the berth-frames, of end partitions rolled upon a revolving roll in a wall recess, and adapted to be drawn out door-like therefrom to form berth-end partitions, and to roll back out of the way when released.

3. A wall recess or case having a vertical slot to permit of the travel of a rolling and unrolling curtain or partition retracted by a spring-roll within the recess, and stopped at the slot by a hand rod or stay, as set forth.

4. The combination of a traveling wall curtain or partition for sleeping-berths, with the ends of the fixed side seats and berth-supporting stanchions or posts, to which said curtains are fastened when drawn out.

5. The combination of a traveling wall curtain or partition for sleeping-berths with the ends of the fixed side seats, the berth-supporting stanchions or posts, and the detachable end boards or partitions of the lower berths.

6. The combination, with separate end rails for the berths, of a traveling wall curtain, adapted to be drawn out and retracted between, above, and below said separate end rails, as set forth.

7. The lower berth of a sleeping-car, ventilated by means of a wall-flue, U, between the windows, and having a registered opening, V, in said berth, and an outlet opening, $p$, on the outside of the said wall at or near the top of the car, as set forth.

8. The shouldered stanchion enlargement K, having vertical dovetail sockets $e$ on three of its sides, in combination with the dovetail tongues $f$ of the front and separate end rails L M, as and for the purpose set forth.

9. The stanchion-sleeve H, having the holding-pin $h$, in combination with the adjustable end partitions J, for holding the latter in place, as described.

In testimony that I claim the foregoing I have affixed my signature in presence of two witnesses.

EUGENE P. KELLOGG.

Witnesses:
   A. E. H. JOHNSON,
   J. W. HAMILTON JOHNSON,